United States Patent
Marimuthu

(10) Patent No.: US 11,163,872 B1
(45) Date of Patent: Nov. 2, 2021

(54) SYSTEMS AND METHODS FOR IDENTIFYING CYBERSECURITY STATUS BASED ON AN ONTOLOGY OF VAULT ITEMS

(71) Applicant: Symantec Corporation, Mountain View, CA (US)

(72) Inventor: Venkadesan Marimuthu, Chennai (IN)

(73) Assignee: NortonLifeLock Inc., Tempe, AZ (US)

( * ) Notice: Subject to any disclaimer, the term of this patent is extended or adjusted under 35 U.S.C. 154(b) by 343 days.

(21) Appl. No.: 16/298,383

(22) Filed: Mar. 11, 2019

(51) Int. Cl.
*G06F 21/00* (2013.01)
*G06F 21/46* (2013.01)
*H04L 29/06* (2006.01)

(52) U.S. Cl.
CPC .......... *G06F 21/46* (2013.01); *H04L 63/1433* (2013.01); *H04L 63/205* (2013.01)

(58) Field of Classification Search
CPC .... G06F 21/46; H04L 63/1433; H04L 63/205
See application file for complete search history.

(56) References Cited

U.S. PATENT DOCUMENTS

| | | | | |
|---|---|---|---|---|
| 8,621,642 B2 * | 12/2013 | Bjorn | ...................... | G06F 21/41 726/26 |
| 8,689,001 B1 * | 4/2014 | Satish | ...................... | G06F 21/46 713/182 |
| 9,077,747 B1 * | 7/2015 | Chen | ................... | H04L 63/1433 |
| 9,781,159 B1 * | 10/2017 | Hernacki | ............ | H04L 63/1483 |
| 2014/0237566 A1 * | 8/2014 | Enache | ................... | G06F 21/46 726/6 |
| 2015/0067760 A1 * | 3/2015 | Waltermann | ............ | G06F 21/46 726/1 |
| 2020/0120081 A1 * | 4/2020 | Sutrala | .................. | H04L 9/0866 |
| 2020/0137038 A1 * | 4/2020 | Endler | .................... | H04L 63/20 |
| 2020/0143037 A1 * | 5/2020 | Sunkavally | ............. | H04L 63/20 |

OTHER PUBLICATIONS

Iwaihara et al., "Risk Evaluation for Personal Identity Management Based on Privacy Attribute Ontology", URL: https://doi.org/10.1007/978-3-540-87877-3-15, Lecture Notes in Computer Science including subseries Lecture Notes in Artificial Intelligence and Lecture Notes in Bioinformatics, vol. 5231, pp. 183-198.
"Dashlane.com Features (Dashlane Inc.)", URL: https://www.dashlane.com/features, as accessed on Apr. 17, 2019, 7 pages.

(Continued)

*Primary Examiner* — Joseph P Hirl
*Assistant Examiner* — Ka Shan Choy
(74) *Attorney, Agent, or Firm* — FisherBroyles, LLP

(57) ABSTRACT

The disclosed computer-implemented method for identifying cybersecurity status based on an ontology of vault items may include (i) identifying, at a computing device, the ontology of a plurality of vault items and (ii) performing a security action including (A) calculating, based on the ontology, a respective impact score for each vault item in the plurality of vault items and (B) calculating a master score of a plurality of passwords from (I) a respective password strength of each password in the plurality of passwords and (II) the respective impact score for each vault item associated with each password in the plurality of passwords. Various other methods, systems, and computer-readable media are also disclosed.

20 Claims, 9 Drawing Sheets

(56) References Cited

OTHER PUBLICATIONS

"Latize Ulysses Platform", Latize Pte Ltd., URL: https://www.latize.com/ulysses-platform/ as accessed on Apr. 17, 2019, 6 pages.
Wang et al., "An Intelligent Framework for Auto-filling Web Forms from Different Web Applications", IEEE Ninth World Congress on Services, 2013, pp. 1-5.

* cited by examiner

| S.No | Item in Vault | Graph Node | Node Weight | Impact |
|---|---|---|---|---|
| 1 | Login | Login Node | total weight of depending nodes | - |
|   |   | Website Node | Weight of corresponding login node | - |
| 2 | Credit card | Credit Card Node | 1.0 | VERY HIGH |
| 3 | Name | Name Node | 0.25 | LOW |
| 4 | Email Id | Email Node | 0.25 | LOW |
| 5 | Phone Number | Phone Node | 0.25 | LOW |
| 6 | Address | Address Node | 0.50 | MEDIUM |
| 7 | Personal Info | Personal Node | 0.75 | HIGH |
| 8 | Non Personal works | Non Personal Node | 0.25 | LOW |

*FIG. 4*

| S.No | Description | Edges Formed (A -> B : B uses A) |
|---|---|---|
| 1 | Gmail is Oauth login for Twitter and Vimeo | Gmail_login -> Twitter_Website<br>Gmail_login -> Vimeo_Website |
| 2 | User logins to Facebook using Facebook_Login | Facebook_login -> Facebook_Website<br>Facebook_Website -> Facebook_login |
| 3 | Gmail is recovery email for Facebook | Gmail_login -> Facebook_login |

| S.No | Node | Password Strength | Password Weakness | Node Weight | Impact Score (Password weakness * weight) |
|---|---|---|---|---|---|
| 1 | BBC_login | 0 | 100 | 0.25 | 25 |
| 2 | yahoo_Login | 0 | 100 | 0.50 | 50 |
| 3 | yoga_club_login | 0 | 100 | 0.25 | 25 |
| 4 | sports_club_login | 10 | 90 | 0.25 | 22.5 |
| 5 | gmail_login | 20 | 80 | Gmail - 0.75<br>Yahoo - 0.75<br>Pinterest - 0.25<br>Vimeo - 0.25<br>Ebay - (4.0)<br>BOA - (4.0)<br>Amazon - (4.0)<br>Total Weight = 14.0 | 1120 |
| 6 | gym_login | 30 | 70 | 0.25 | 17.5 |

FIG. 7

SYSTEMS AND METHODS FOR IDENTIFYING CYBERSECURITY STATUS BASED ON AN ONTOLOGY OF VAULT ITEMS

BACKGROUND

Password managers may store user login credentials for various accounts, websites, addresses, phone numbers, credit cards, and/or notes. The password managers may automatically fill-in requests for passwords in order for users to quickly access secured information. Some password managers may calculate password strengths based on usage of common password strings, duplicate passwords, and age of passwords. Password managers may determine a master password strength across all stored passwords by finding an average of all password strengths. However, this method does not reflect an actual impact of weak passwords on security of personally identifiable information (PII) protected by passwords stored by the password manager. For example, a weak password for a local news website login may have essentially no impact, where a weak password for an account used as open authorization (e.g., OAuth) login may have a great impact. The present disclosure, therefore, identifies and addresses a need for systems and methods for identifying cybersecurity status based on an ontology of vault items.

SUMMARY

As will be described in greater detail below, the present disclosure describes various systems and methods for identifying cybersecurity status based on an ontology of vault items.

In one example, a method for identifying cybersecurity status based on an ontology of vault items may include (i) identifying, at the computing device, the ontology of a plurality of vault items and (ii) performing a security action including (A) calculating, based on the ontology, a respective impact score for each vault item in the plurality of vault items and (B) calculating a master score of a plurality of passwords from (I) a respective password strength of each password in the plurality of passwords and (II) the respective impact score for each vault item associated with each password in the plurality of passwords.

In one example, the method may include identifying relationship information describing relationships between vault items in the plurality of vault items and building the ontology of vault information from the plurality of vault items and the relationship information.

In some examples, the method may include displaying, on a user display device, a request for the relationship information. In an embodiment, the method may include identifying the relationship information based on credit card use on a website, where the website is associated with a vault item in the plurality of vault items. In some embodiments, the method may include identifying the relationship information based on user inputs to a website, where the website may be associated with a vault item in the plurality of vault items.

In one example, the method may include weighting a respective impact of respective relationship information between respective vault items based on a frequency of use of at least one of the respective vault items in the plurality of vault items. In some examples, the method may include weighting a respective impact of the respective relationship information between respective vault items based on a security importance of at least one of the respective vault items in the plurality of vault items.

In an embodiment, the method may include calculating the respective impact score for a respective vault item may be based on a number of relationships the respective vault item has with other vault items in the plurality of vault items. In some embodiments, calculating the respective impact score may include weighting the password strength for a respective vault item by a number of relationships the respective vault item has with other vault items in the plurality of vault items. In one example, calculating the master score of the plurality of passwords may include calculating an average of weighted password strengths for respective vault items in the plurality of vault items.

In some examples, at least one vault item in the plurality of vault items may include at least one of: login information, credit card information, email information, a phone number, postal address information, and/or personally identifiable information.

In an embodiment, the method may include displaying, on a user display device, a graph depicting the ontology of the plurality of vault items.

In some embodiments, the security action may include displaying, on a user display device, a warning indicating the master score may be below a predetermined threshold. In one example, the security action may include (i) prioritizing vault items in the plurality of vault items by respective impact scores and (ii) displaying, on a user display device, a list of vault items, where the list of vault items may be prioritized by respective impact scores. In some examples, the security action may include displaying, on a user display device and based on the respective impact score, a recommendation to change login information associated with a vault item having a respective impact score below a predetermined threshold. In an embodiment, the security action may include initiating, in response to the master score being below a predetermined threshold, a process to identify a vault item as compromised.

In one embodiment, a system for identifying cybersecurity status based on an ontology of vault items may include at least one physical processor and physical memory that includes computer-executable instructions that, when executed by the physical processor, cause the physical processor to (i) identify the ontology of a plurality of vault items and (ii) perform a security action including (A) calculating, based on the ontology, a respective impact score for each vault item in the plurality of vault items and (B) calculating a master score of a plurality of passwords from (I) a respective password strength of each password in the plurality of passwords and (II) the respective impact score for each vault item associated with each password in the plurality of passwords.

In some examples, the described methods may be encoded as computer-readable instructions on a non-transitory computer-readable medium. For example, a computer-readable medium may include one or more computer-executable instructions that, when executed by at least one processor of a computing device, may cause the computing device to (i) identify the ontology of a plurality of vault items and (ii) perform a security action including (A) calculating, based on the ontology, a respective impact score for each vault item in the plurality of vault items and (B) calculating a master score of a plurality of passwords from (I) a respective password strength of each password in the plurality of passwords and (II) the respective impact score for each vault item associated with each password in the plurality of passwords.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 4 is a non-limiting example of vault items, nodes, impacts of the nodes, and respective weights.

FIG. 5 depicts a non-limiting example of edges relating vault items.

FIG. 7 is a non-limiting example of respective impact scores for example vault items.

Figure 1:
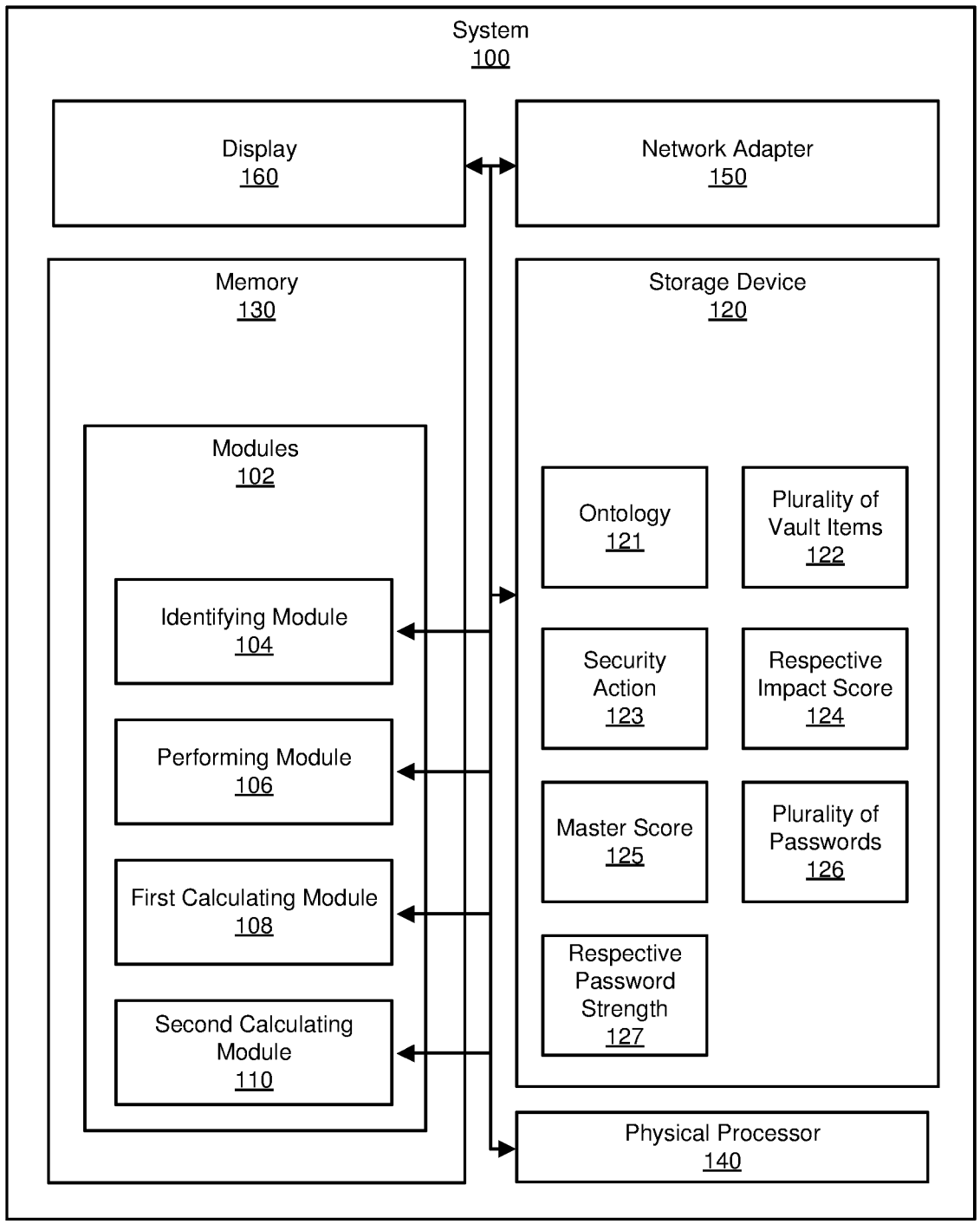
FIG. 1 is a block diagram of an example system for identifying cybersecurity status based on an ontology of vault items.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying cybersecurity status based on an ontology of vault items. In some examples, provided are techniques that may determine impacts of weak passwords of on-line accounts on other on-line accounts and determine a cybersecurity status resulting from the impacts. In some embodiments, provided techniques may compute impact scores of vault items by finding items (e.g., on-line accounts) impacted by the vault items based on ontologies of user information describing the vault items and relationships therebetween. In some examples, master scores of groups of passwords can be determined based on strength of passwords protecting vault items and the respective impact scores.

By doing so, the systems and methods described herein may improve functioning of a computing device and/or provide targeted protection against malware, and thus improve fields of malware protection in general, by providing a method for automatically identifying weak passwords. Examples of the provided techniques improve a state of security of target computing devices, potentially resulting in significant time and/or monetary savings. Thus, disclosed systems and methods may provide asset protection for common targets of malware, such as hospitals, shipping companies, financial companies, governments, etc. by reducing recovery times needed to resume operations.

Figure 2:
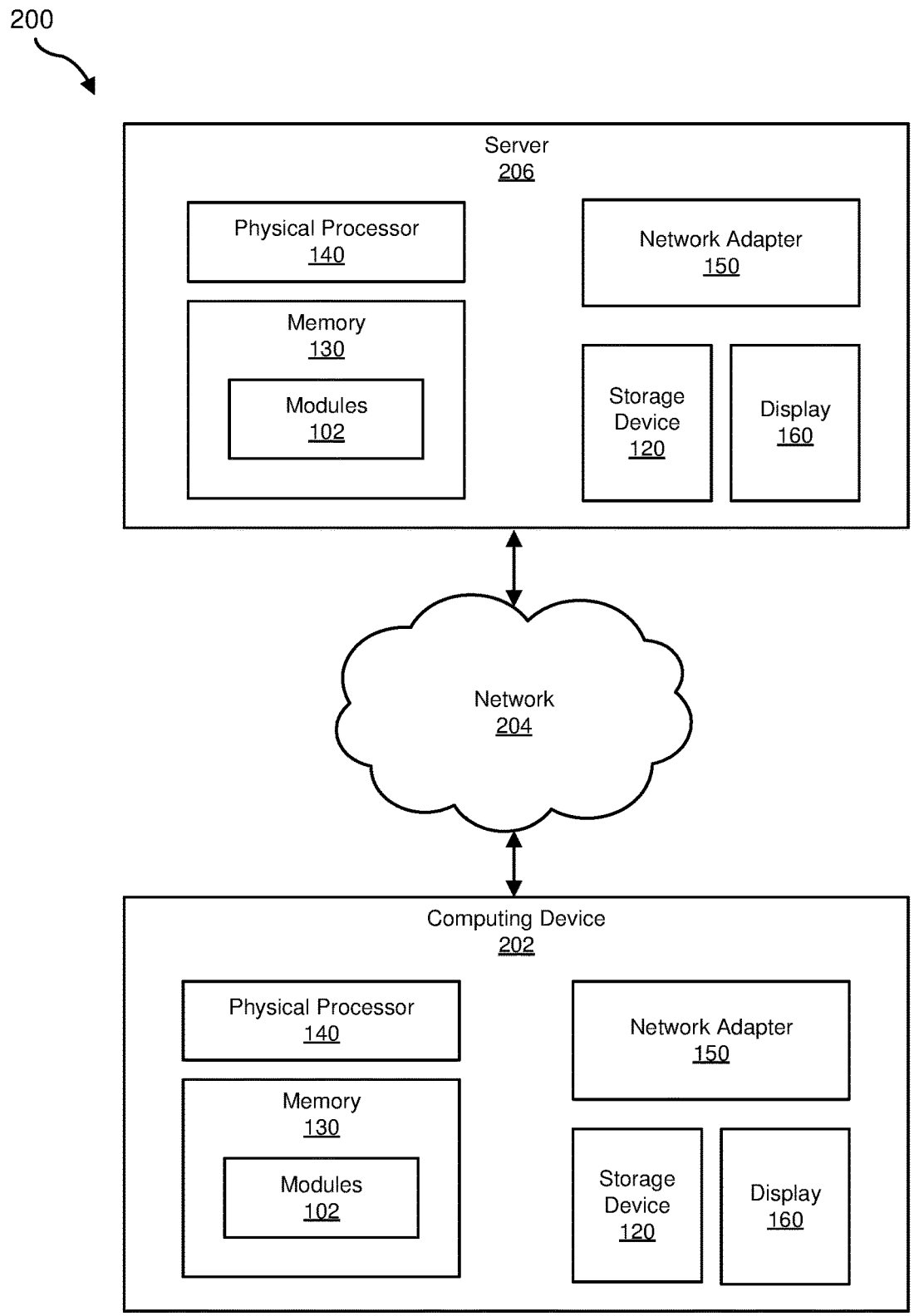
FIG. 2 is a block diagram of an additional example system for identifying cybersecurity status based on an ontology of vault items.

The following will provide, with reference to FIGS. 1-2, detailed descriptions of example systems for identifying cybersecurity status based on an ontology of vault items. Detailed descriptions of corresponding computer-implemented methods will also be provided in connection with FIGS. 3-7. In addition, detailed descriptions of an example computing system and network architecture capable of implementing one or more of the embodiments described herein will be provided in connection with FIGS. 8 and 9, respectively.

FIG. 1 is a block diagram of an example system 100 for identifying cybersecurity status based on an ontology of vault items. As illustrated in this figure, example system 100 may include one or more modules 102 for performing one or more tasks. As will be explained in greater detail below, modules 102 may include an identifying module 104, a performing module 106, a first calculating module 108, and/or a second calculating module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of characteristics of an ontology 121, a plurality of vault items 122, a security action 123, a respective impact score 124, a master score 125, a plurality of passwords 126, and/or a respective password strength 127. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

The term "ontology" (e.g., ontology 121), as used herein, may generally refer to an ontology of the plurality of vault items. Generally, ontologies may describe things and relationships between the things.

The term "plurality of vault items" (e.g., plurality of vault items 122), as used herein, may generally refer to vault items such as, and not limited to passwords and/or information secured by at least one respective password such as, and not limited to, login information, credit card information, email information, a phone number, postal address information, and/or personally identifiable information.

The term "respective impact score" (e.g., respective impact score 124), as used herein, may generally refer to a respective impact score that a vault item in the plurality of vault items may have on other vault items, such as directly, indirectly, or both. In examples, respective impact score 124 may be calculated from aspects of ontology 121. In an example, a weak password used to access a shopping website that readily displays stored credit card information may have a high impact score relative to a different weak password used to access a news website. In another example, the weak password used to access the shopping website that readily displays stored credit card information may have a high impact score relative to a strong password used to access a different shopping website that readily displays the same stored credit card information.

The term "master score" (e.g., master score 125), as used herein, may generally refer to a master score of a plurality of passwords. In some examples, master scores may describe overall levels of cybersecurity provided by vault items.

The term "respective password strength" (e.g., respective password strength 127), as used herein, may generally refer to a strength of a password. In some examples, password strengths may be calculated based on usage of common password strings, duplicate passwords, and/or age of passwords.

As illustrated in FIG. 1, example system 100 may also include one or more memory devices, such as memory 130. Memory 130 generally represents any type or form of volatile or non-volatile storage device or medium capable of storing data and/or computer-readable instructions. In one example, memory 130 may store, load, and/or maintain one or more of modules 102. Examples of memory 130 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 140. Physical processor 140 generally represents any type or form of hardware-implemented processing unit capable of interpreting and/or executing computer-readable instructions. In one example, physical processor 140 may access and/or modify one or more of modules 102 stored in memory 130. Additionally or alternatively, physical processor 140 may execute one or more of modules 102 to facilitate identifying cybersecurity status based on an ontology of vault items. Examples of physical processor 140 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more network adapters, such as network adapter 150. In some examples, network adapter 150 may be a physical network adapter connected to a physical network (e.g., network 204 in FIG. 2).

As illustrated in FIG. 1, example system 100 may also include one or more display devices, such as display 160. Display 160 generally represents any type or form of device capable of visually displaying information (e.g., to a user). In some examples, display 160 may present a graphical user interface (e.g., to enable user interaction with system 100). In non-limiting examples, display 160 may present information indicating one or more of characteristics of at least a portion of ontology 121, plurality of vault items 122, security action 123, respective impact score 124, master score 125, plurality of passwords 126, and/or respective password strength 127. In some examples, display 160 may be a touchscreen device configured to display a user interface and/or receive user input.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify cybersecurity status based on ontology of vault items. For example, and as will be described in greater detail below, one or more of modules 102 may cause computing device 202 and/or server 206 to (i) identify ontology 121 of plurality of vault items 122 and (ii) perform security action 123 including (A) calculating, based on the ontology, respective impact score 124 for each vault item in plurality of vault items 122 and (B) calculating master score 125 of plurality of passwords 126 from (I) respective password strength 127 of each password in plurality of passwords 126 and (II) respective impact score 124 for each vault item associated with each password in plurality of passwords 126.

Subscription-management computing device 202 generally represents any type or form of computing device capable of reading computer-executable instructions. In some examples, computing device 202 may represent a computer running security software, such as cybersecurity software and/or privacy software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that may be capable of reading computer-executable instructions. In some examples, server 206 may represent a computer running security software, such as cybersecurity software and/or privacy software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
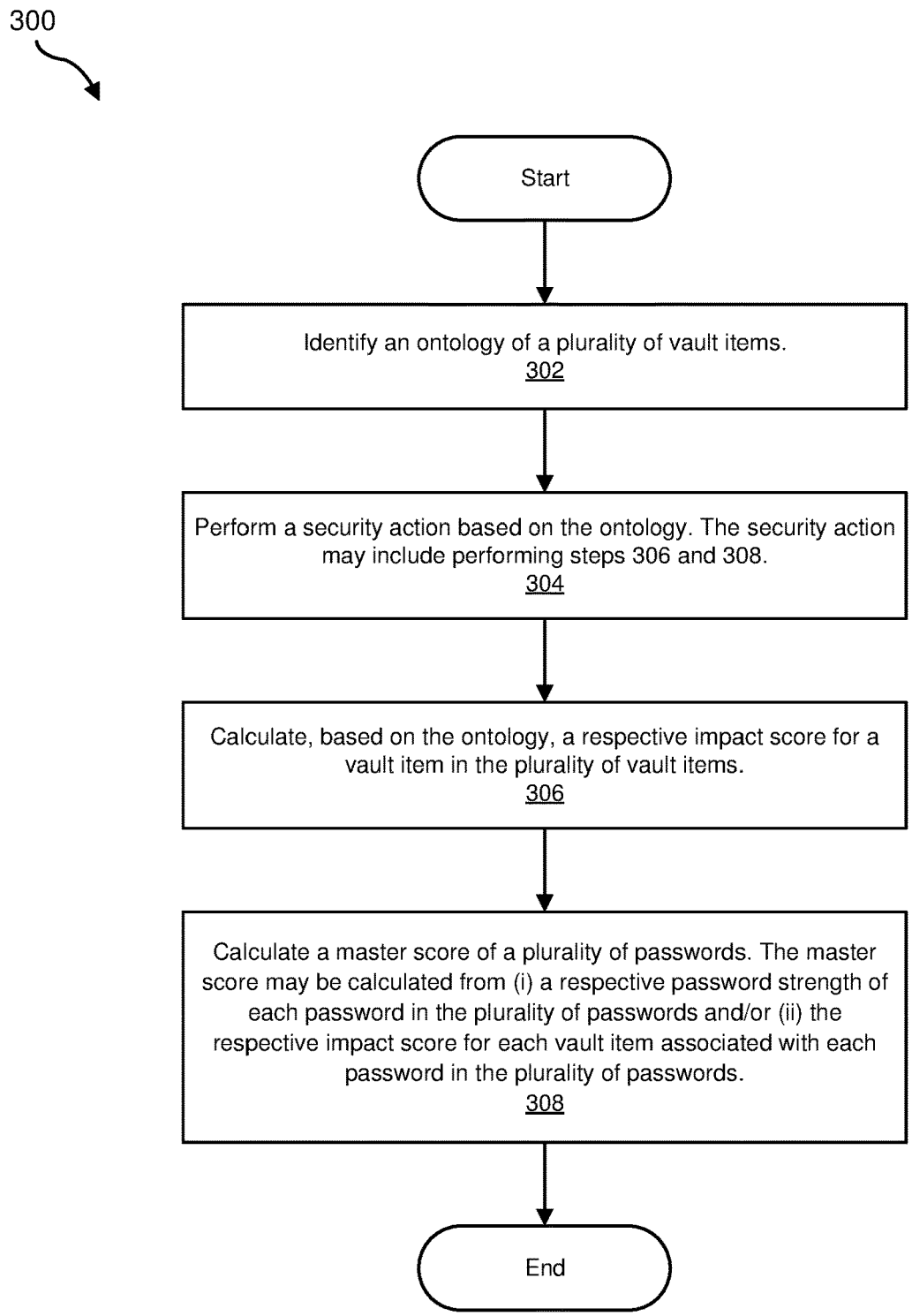
FIG. 3 is a flow diagram of an example method for identifying cybersecurity status based on an ontology of vault items.

FIG. 3 is a flow diagram of an example computer-implemented method 300 for identifying cybersecurity status based on an ontology of vault items. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or may be represented by multiple sub-steps, examples of which will be provided in greater detail below.

As illustrated in FIG. 3, at step 302 one or more of the systems described herein may identify (e.g., at a computing device) ontologies of pluralities of vault items. The systems described herein may perform step 302 in a variety of ways. For example, identifying module 104 may, as part of computing device 202 in FIG. 2, identify ontology 121 of plurality of vault items 122.

In some examples, method 300 may further include identifying relationship information describing relationships between vault items in the plurality of vault items and building the ontologies of vault information from the pluralities of vault items and the relationship information. In some examples, identifying ontologies may include identifying vault items (e.g., as nodes). In some embodiments, nodes may be formed from information describing logins, websites, personally identifying information stored in accounts, the like, or a combination thereof. FIG. 4 depicts a non-limiting example 400 of vault items, nodes, impacts of the nodes, and respective weights.

Returning to FIG. 3, in some examples, identifying ontologies may include identifying edges (e.g., relationships) between nodes.

In some examples, identifying edges may include requesting user input describing relationships between vault items, such as through a user interface of a password manager. In some embodiments, password managers may ask questions of users such as "what is the registered email account of your WalMart shopping account?" In an embodiment, method 300 may further include displaying, on user display devices, requests for the relationship information. In an embodiment, method 300 may further include receiving (e.g., from a user input device), the relationship information.

In some examples, identifying edges may include automated context tracking that may in some circumstances require requesting and receiving user consent. As an example of automated context tracking, when a user chooses an address (A) for shipping and pays through credit card (C) for an online purchase after sign-in with account (L) in an e-commerce site (W), the provided systems automatically track user activity and automatically generate edges W->L, L->W, A->L and C->L, where edges may be represented as "A->B" such that if vault item "B" may be compromised to an extent, then vault item "A" may also be compromised (e.g., to at least a substantially similar extent). FIG. 5 depicts a non-limiting example 500 of edges relating vault items.

Returning to FIG. 3, in one example, method 300 may further include identifying the relationship information based on credit card use on websites, where the websites may be associated with vault items in the plurality of vault items. In an embodiment, method 300 may further include identifying the relationship information based on user inputs to websites. In an example, the websites may be associated with vault items in the pluralities of vault items.

In some embodiments, vault items in the pluralities of vault items may include at least one of: login information, credit card information, email information, a phone number, postal address information, and/or personally identifiable information.

Some users may wonder what items and respective relationships may be in the ontologies. In some examples, method 300 may further include displaying, on user display devices such as display 160, graphs depicting the ontologies of the pluralities of vault items. In examples, vault items and relations between the vault items may be displayed on a user display.

Figure 6:
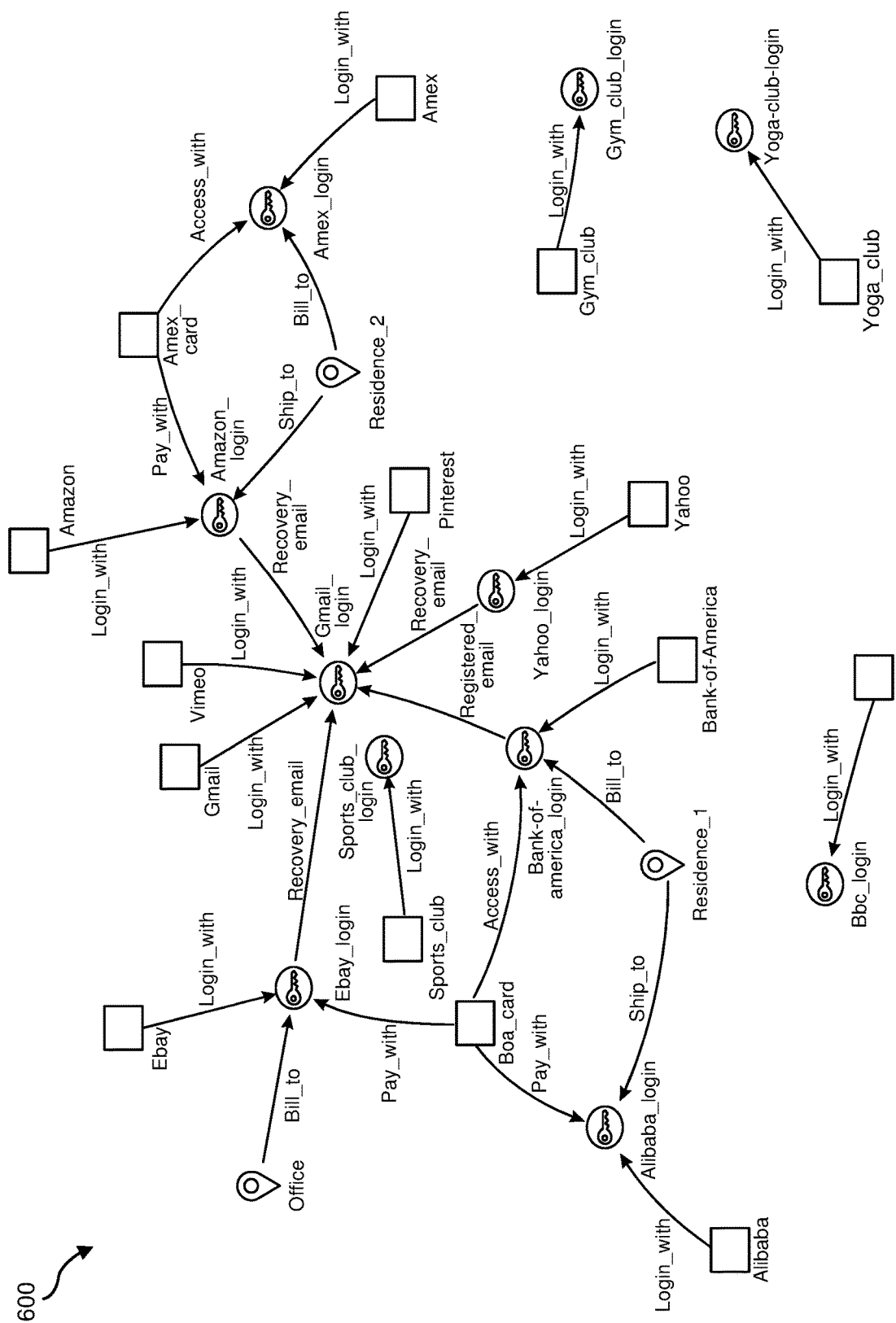
FIG. 6 is a non-limiting example of respective impact scores for example vault items.

FIG. 6 is a non-limiting example of an ontology 600 for example vault items. In example ontology 600, the gmail login has the largest number of incoming edges, and thus is the most impactful node in example ontology 600. Thus, a weak gmail login password may significantly weaken the cybersecurity of many other nodes. Also in example ontology 600, the gym club login is one of the least impactful nodes, as the gym club login has only one incoming node. Thus, a weak gym club login password may significantly weaken no other nodes. We now return to FIG. 3.

As illustrated in FIG. 3, at step 304 one or more of the systems described herein may perform security actions (e.g., in response to identifying ontologies). The systems described herein may perform step 304 in a variety of ways. For example, performing module 106 may, as part of computing device 202 in FIG. 2, perform security action 123.

In some examples, the security actions may include initiating steps 306 and/or 308. In some examples, the security actions may include performing steps 306 and/or 308. For example, performing module 106 may, as part of computing device 202 in FIG. 2, perform security action 123, where security action 123 may include performing steps 306 and/or 308.

In some examples, security action 123 may include blocking access to devices (e.g., storage devices, memories, network devices, etc.), allowing limited access to devices, allowing read-only access to devices, encrypting information, and/or other acts limiting access to devices. In some examples, security action 123 may be performed automatically. In some embodiments, security action 123 may attempt to identify and/or ameliorate potential security risks. In some examples, security action 123 many include blocking access to and/or by executing processes. In additional examples, security action 123 may include displaying, on user displays, warnings indicating that processes may be potentially dangerous. In some examples, security action 123 may include identifying a compromised vault item and using ontology 121 to identify other vault items that may be compromised as a result.

As illustrated in FIG. 3, at step 306 one or more of the systems described herein may calculate, based on the ontologies, respective impact scores for each vault item in the pluralities of vault items. The systems described herein may perform step 306 in a variety of ways. For example, first calculating module 108 may, as part of computing device 202 in FIG. 2, calculate, based on ontology 121, respective impact score 124 for each vault item in plurality of vault items 122.

In some examples, impact scores may be determined in part by calculating a Password Strength (Sx) of vault item X (e.g., a login node X). Password Strengths may be described as a percentage (%).

In some examples, impact scores may be determined in part by calculating a Weight (Wx) of the vault item X (e.g., the login node X), such as by recursively calculating Wx as a cumulative weight of nodes corresponding to edges incoming to vault item X.

In some examples, impact scores may be determined in part by calculating an Impact Score (Ix) of the vault item X (e.g., the login node X) as a product of (password weakness) (weight). In other words, in a non-limiting example, Ix= (100%−Sx)*Wx. In some embodiments, respective impact scores may be calculated for multiple nodes.

FIG. 7 is a non-limiting example of respective impact scores 700 for example vault items. Respective impact scores 700 indicate the example gmail login has a highest relative impact score and thus should be prioritized as first to have weaknesses fixed. Respective impact scores 700 indicate the example yahoo login has a second highest relative impact score and thus should be prioritized as second to have weaknesses fixed.

Returning to FIG. 3, in one example, method 300 may include, as a part of calculating respective impact scores, weighting respective impacts of respective relationship information between respective vault items based on frequencies of use of at least one of the respective vault items in the pluralities of vault items. In some examples, method 300 may include, as a part of calculating respective impact scores, weighting respective impacts of the respective relationship information between respective vault items based on security importance of at least one of the respective vault items in the pluralities of vault items.

In an embodiment, the respective impact scores for respective vault items may be based on numbers of relationships the respective vault items have with other vault items in the pluralities of vault items. In some embodiments, calculating the respective impact scores may include weighting the password strengths for respective vault items by the numbers of relationships the respective vault items have with other vault items in the pluralities of vault items.

The following psuedocode describes an example nonlimiting method for computing impact scores:

findImpactScore(nodeX)//returns impact score of nodeX
1. Start
2. Let Ex<-Get All incoming edges of nodeX
3. Let total_weight<-0; impact score<-0;
4. Let visited_nodes_list<-EMPTY_LIST
5. For each edge (e) in Ex do
6. N←Get other endpoint node of e
7. If getNodeType(N)=='Login'
8. total_weight=total_weight+findTotalWeight(N)
9. else if (N not in visited_nodes_list)//to avoid same PII info loss is considered again
10. total_weight=total_weight+findWeight(N)//assigned weights of PII nodes
11. visited_nodes_list<-visited_nodes_list+N//Include N in list
12. end if
13. End For
14. Return total_weight*(100−getPasswordStrength(nodeX));
15. End In some examples, the security actions may include (i) prioritizing vault items in the pluralities of vault items by respective impact scores and (ii) displaying, on user display devices, lists of vault items, where the lists of vault items may be prioritized by respective impact scores. In an embodiment, the security actions may include displaying, on user display devices and based on the respective impact scores, recommendations to change login information (e.g., passwords) associated with vault items having respective impact scores below predetermined thresholds.

As illustrated in FIG. 3, at step 308 one or more of the systems described herein may calculate master scores of pluralities of passwords. In some examples, the master scores may be may be calculated from (i) respective password strengths of each password in the pluralities of passwords and/or (ii) respective impact scores for each vault item associated with each password in the pluralities of passwords. The systems described herein may perform step 308 in a variety of ways. For example, second calculating module 110 may, as part of computing device 202 in FIG. 2, calculate master score 125 of plurality of passwords 126 from (i) respective password strength 127 of each password in plurality of passwords 126 and (ii) respective impact score 124 for each vault item associated with each password in plurality of passwords 126.

In one example, calculating the master scores of the pluralities of passwords may include calculating averages of weighted password strengths for respective vault items in the pluralities of vault items. In some embodiments, master scores may be calculated as averages of impact scores of substantially all nodes in vaults.

In some examples, the security action may include displaying, on user display devices such as display 160, warnings indicating the master scores may be below predetermined thresholds. In an embodiment, the security action may include initiating, in response to the master scores being below the predetermined thresholds, processes to identify vault items as compromised.

The following example further explains the benefits and advantages of the methods described hereby. In a non-limiting example, provided are the following example passwords and respective password strengths:

(Vault Item) (Password Strength)
Website one login-100
Email login-0
Shopping site One login-100
Shopping site Two login-100
Credit Card login-100
Shopping site Three login-100
Bank login-100

A master score calculated by averaging only these password strengths equals 600/7=86%, which may be considered a strong score. However, identifying incoming edges yields the following example impact scores:

(Vault Item) (Password Strength) (Number of Incoming Edges) (Impact Score)
Website one login-100-1-100
Email login-0-17-0
Shopping site One login-100-3-300
Shopping site Two login-100-3-300
Credit Card login-100-3-300
Shopping site Three login-100-3-300
Bank login-100-3-300

An impact-based master score calculated by averaging impact scores equals 1600/33=48%, which may be considered a weak score. Thus, an ontology-based approach may more accurately identify cybersecurity strength and may more accurately identify weak passwords.

As detailed herein, the steps outlined in method 300 in FIG. 3 may enable computing devices to improve a state of cybersecurity of target computing devices, potentially resulting in significant time and/or monetary savings. Examples of the provided techniques described herein may improve functioning of a computing device and/or provide targeted protection against malware, and thus improve fields of malware protection in general, by providing a method for automatically identifying weak passwords. Thus, disclosed systems and methods may provide asset protection for common targets of malware, such as hospitals, shipping companies, financial companies, governments, etc. by reducing recovery times needed to resume operations.

Figure 8:
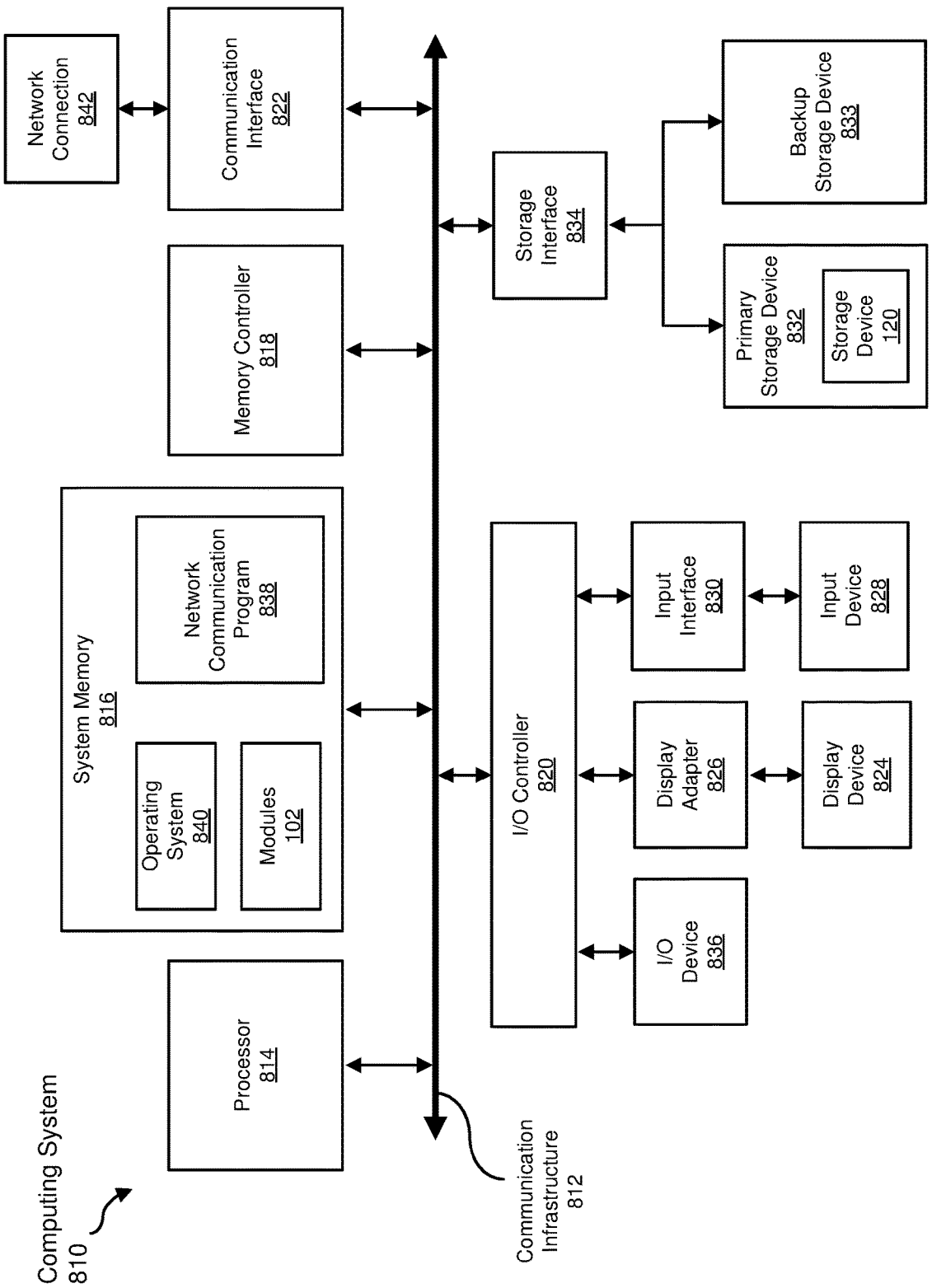
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like.

Storage interface 834 generally represents any type or form of interface or device for transferring data between storage devices 832 and 833 and other components of computing system 810. In one example, storage device 120 from FIG. 1 may be at least a part of primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced herein may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
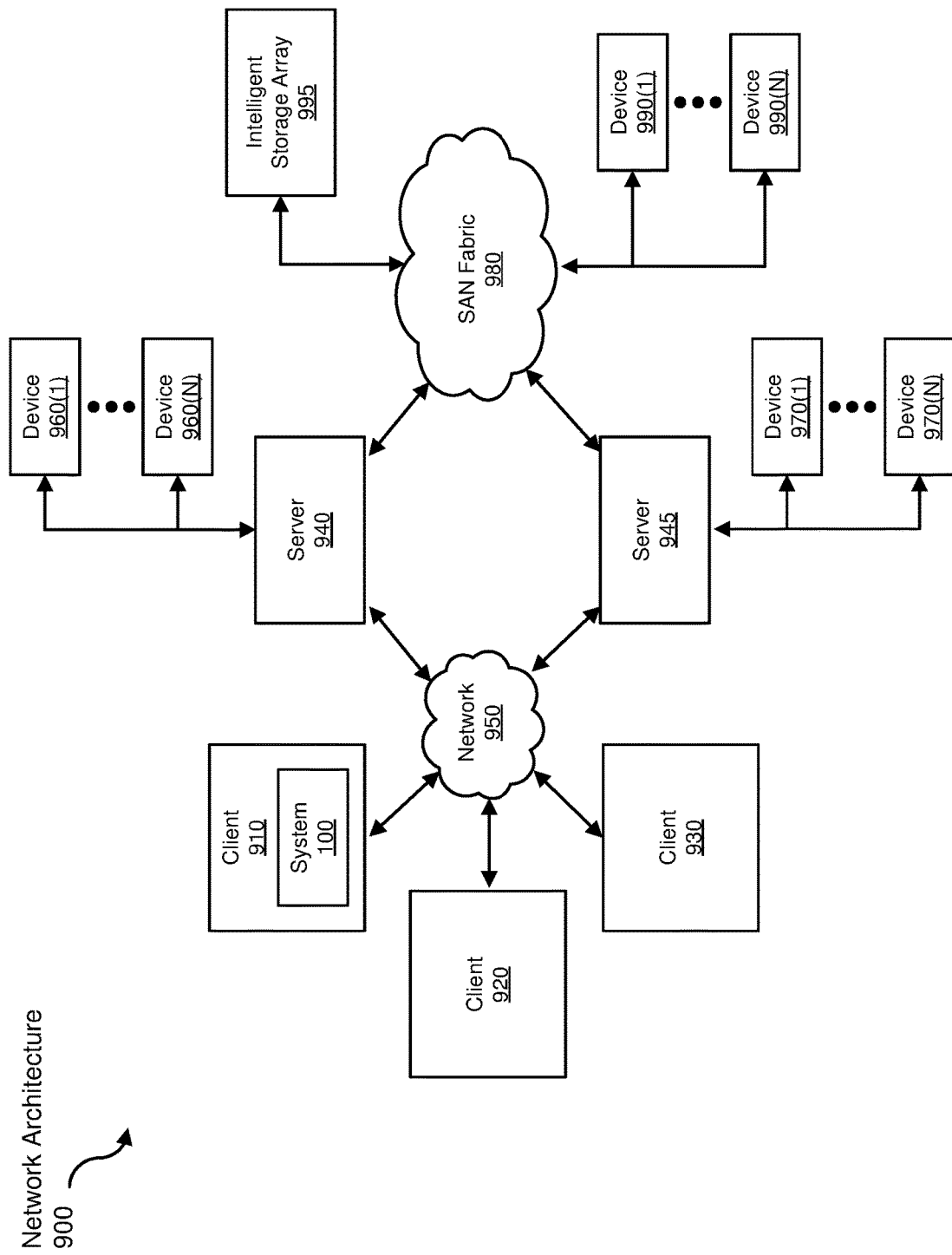
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed herein, all or a portion of network architecture 900 may perform and/or be a means for performing, either alone or in combination with other elements, one or more of the steps disclosed herein (such as one or more of the steps illustrated in FIG. 3). All or a portion of network architecture

900 may also be used to perform and/or be a means for performing other steps and features set forth in the present disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed herein, computing system 810 and/or one or more components of network architecture 900 may perform and/or be a means for performing, either alone or in combination with other elements, one or more steps of an example method for identifying cybersecurity status based on an ontology of vault items.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed. In some examples, the singular portends the plural.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive ontology information to be transformed, transform the ontology information, output a result of the transformation to a user display, use the result of the transformation to calculate a respective impact score, and store the result of the transformation to a digital storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying cybersecurity status based on an ontology of a plurality of vault items, at least a portion of the method being performed by a computing device comprising at least one processor, the method comprising:

identifying, at the computing device, relationship information describing relationships between vault items in the plurality of vault items, the relationship information being based on credit card use on a website associated with a vault item included in the plurality of vault items, or on user inputs to a website associated with a vault item included in the plurality of vault items;

building the ontology of the plurality of vault items using the relationship information; and performing a security action comprising:
calculating, based on the ontology, a respective impact score for each vault item in the plurality of vault items; and
calculating a master score of a plurality of passwords from:
a respective password strength of each password in the plurality of passwords; and
the respective impact score for each vault item associated with each password in the plurality of passwords.

2. The method of claim 1, further comprising displaying, on a user display device, a request for the relationship information.

3. The method of claim 1, further comprising weighting a respective impact of respective relationship information between respective vault items based on a frequency of use of at least one of the respective vault items in the plurality of vault items.

4. The method of claim 1, further comprising weighting a respective impact of the respective relationship information between respective vault items based on a security importance of at least one of the respective vault items in the plurality of vault items.

5. The method of claim 1, wherein calculating the respective impact score for a respective vault item is based on a number of relationships the respective vault item has with other vault items in the plurality of vault items.

6. The method of claim 1, wherein calculating the respective impact score further comprises weighting the password strength for a respective vault item by a number of relationships the respective vault item has with other vault items in the plurality of vault items.

7. The method of claim 6, wherein calculating the master score of the plurality of passwords further comprises calculating an average of weighted password strengths for respective vault items in the plurality of vault items.

8. The method of claim 1, wherein at least one vault item in the plurality of vault items comprises at least one of:
login information;
credit card information;
email information;
a phone number;
postal address information; and
personally identifiable information.

9. The method of claim 1, further comprising displaying, on a user display device, a graph depicting the ontology of the plurality of vault items.

10. The method of claim 1, wherein performing the security action further comprises displaying, on a user display device, a warning indicating the master score is below a predetermined threshold.

11. The method of claim 1, wherein performing the security action further comprises:
prioritizing vault items in the plurality of vault items by respective impact scores; and
displaying, on a user display device, a list of vault items, wherein the list of vault items is prioritized by respective impact scores.

12. The method of claim 1, wherein performing the security action further comprises displaying, on a user display device and based on the respective impact score, a recommendation to change login information associated with a vault item having a respective impact score below a predetermined threshold.

13. The method of claim 1, wherein performing the security action further comprises automatically changing login information associated with a vault item having a respective impact score below a predetermined threshold.

14. The method of claim 1, wherein performing the security action further comprises initiating, in response to the master score being below a predetermined threshold, a process to identify a vault item as compromised.

15. A system for identifying cybersecurity status based on an ontology of a plurality of vault items, the system comprising:
at least one physical processor; and
physical memory comprising computer-executable instructions that, when executed by the physical processor, cause the physical processor to:
identify relationship information describing relationships between vault items in the plurality of vault items, the relationship information being based on credit card use on a website associated with a vault item included in the plurality of vault items, or on user inputs to a website associated with a vault item included in the plurality of vault items;
build the ontology of the plurality of vault items using the relationship information; and
perform a security action comprising:
calculating, based on the ontology, a respective impact score for each vault item in the plurality of vault items; and
calculating a master score of a plurality of passwords from:
a respective password strength of each password in the plurality of passwords; and
the respective impact score for each vault item associated with each password in the plurality of passwords.

16. The system of claim 15,
wherein:
calculating the respective impact score further comprises weighting the password strength for a respective vault item by a number of relationships the respective vault item has with other vault items in the plurality of vault items; and
calculating the master score of the plurality of passwords further comprises calculating an average of weighted password strengths for respective vault items in the plurality of vault items.

17. The system of claim 15, wherein performing the security action further comprises displaying, on a user display device, a warning indicating the master score is below a predetermined threshold.

18. The system of claim 15, wherein performing the security action further comprises:
prioritizing vault items in the plurality of vault items by respective impact scores; and
displaying, on a user display device, a list of vault items, wherein the list of vault items is prioritized by respective impact scores.

19. A non-transitory computer-readable medium comprising one or more computer-executable instructions that, when executed by at least one processor of a computing device, cause the computing device to:
identify relationship information describing relationships between vault items in a plurality of vault items, the relationship information being based on credit card use on a website associated with a vault item included in the plurality of vault items, or on user inputs to a website associated with a vault item included in the plurality of vault items;

build an ontology of the plurality of vault items using the relationship information; and perform a security action comprising:

calculating, based on the ontology, a respective impact score for each vault item in the plurality of vault items; and calculating a master score of a plurality of passwords from:

a respective password strength of each password in the plurality of passwords; and the respective impact score for each vault item associated with each password in the plurality of passwords.

20. The non-transitory computer-readable medium of claim 19, wherein:

calculating the respective impact score further comprises weighting the password strength for a respective vault item by a number of relationships the respective vault item has with other vault items in the plurality of vault items; and calculating the master score of the plurality of passwords further comprises calculating an average of weighted password strengths for respective vault items in the plurality of vault items.

* * * * *